Nov. 2, 1937.  A. H. HABERSTUMP  2,097,976

SEAT FRAME CONSTRUCTION

Filed May 21, 1937

INVENTOR
Alfred H. Haberstump.
BY
Harness, Dickey & Pierce
ATTORNEYS.

Patented Nov. 2, 1937

2,097,976

UNITED STATES PATENT OFFICE 2,097,976

SEAT FRAME CONSTRUCTION

Alfred H. Haberstump, Detroit, Mich., assignor to The Murray Corporation of America, Detroit, Mich., a corporation of Delaware Application May 21, 1937, Serial No. 144,074

2 Claims. (Cl. 155—180)

This invention relates generally to cushion constructions, and is a continuation in part of application Serial No. 743,946, filed September 14, 1934. The present application relates to a simple, strong and easily fabricated base frame which will find particular practical utility in seat constructions for use in automotive vehicles.

In modern automobile body constructions rigid base frame structures for the cushions are not only desirable, but virtually necessary inasmuch as the supports for the cushions are not adequate to provide the reinforcement needed.

It is an object of the present invention to provide a seat cushion construction made up of a plurality of similar members secured together to provide a relatively rigid frame structure of generally rectangular configuration which frame is provided with a portion of the metal from which the frame is formed, bent upon itself, to provide a flange of double thickness, which flange lies substantially in the plane of, or in a plane parallel to the plane of the base frame as a whole. This structure increases the resistance of the individual frame members to bending stresses, provides a construction which is easily assembled to provide a rigid frame and inherently provides a rigid projecting flange to which the various brace members may conveniently be welded by a spot welding operation.

It is a further object of the present invention to provide a frame structure which includes members extending across the frame from side to side thereof, which members are welded in overlapping relation, which brace members not only serve the purpose of bracing and strengthening the base frame but serve to provide means for supporting and anchoring the lower ends of the coil springs conventionally utilized to form the cushion construction.

The invention further contemplates the provision of a base frame structure having the above enumerated advantages and features and in addition having the marginal members so formed as to provide a channel therein adapted to receive a tacking strip. These tacking strips are conventionally used for securing the upholstery or covering material in position upon the cushion structure as a whole.

Many other objects, advantages and features will become clearly apparent from the following specification when considered in connection with the accompanying drawing forming a part thereof.

Figure 1:
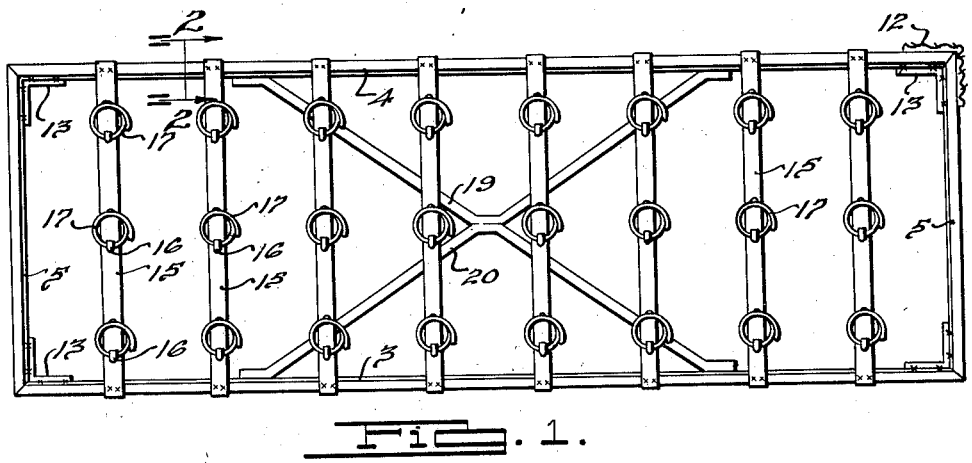
Figure 1 is a top plan view of a base frame for a seat cushion.
Figure 2:
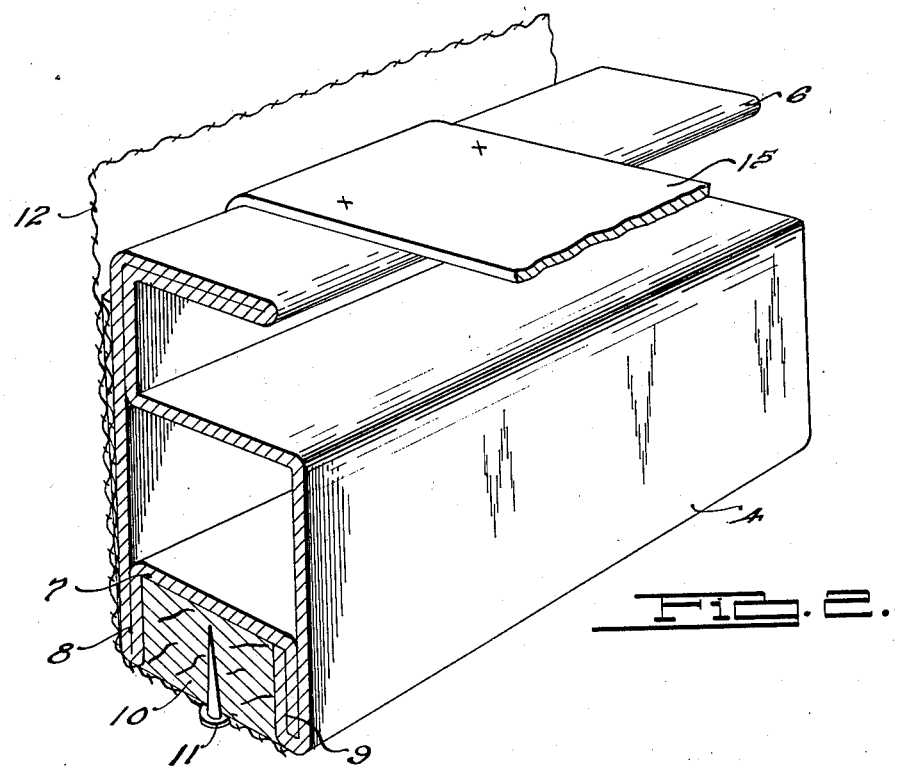
Fig. 2 is a substantially enlarged fragmentary perspective view showing in detail the construction of one of the frame members.

With more particular reference to the drawing it will be readily understood that the improved cushion construction illustrated will find broad practical utility in many and different forms of cushion constructions, but is primarily and particularly designed for use in connection with automotive vehicles.

The frame is made up of front and rear members 3 and 4 respectively, the ends of which are joined together by means of end members 5 to provide a generally rigid rectangular frame of the particular size and shape desired. The frame members 3, 4 and 5 are preferably formed from sheet metal rolled to provide a cross-sectional configuration substantially as shown in Figure 5. In the particular specific form shown the sheet metal strip is folded upon itself in the central portion thereof to provide a flange 6 consisting of a double thickness of metal which in the completed structure will lie in the plane of the base frame structure as a whole.

The marginal portions are bent to provide a downwardly presented channel having a base or web 7 and one side wall 8 formed by one edge portion of the strip and a second side wall portion 9 formed by the other side wall portion of the strip. As is conventional in constructions of this general character a tacking strip 10 of wood or compressed paper may be seated within the channel thus formed and may be used to anchor tacks 11 for securing upholstery or covering material 12 in position upon the completed cushion structure.

In order that the completed cushion structure will have an attractive finished appearance and in order that the tacking strip will be reasonably accessible during the upholstery securing operation, it is generally advisable to construct the frame members with the tacking strip receiving channel presented downwardly whereby the base of this channel will lie in a plane parallel to the double thickness flange 6.

The frame members 3, 4 and 5 may have their ends cut off at 45° angles to provide mitered joints at the corners, which may be conveniently welded together or otherwise suitably secured, and in order to provide additional strength angle irons 13 may be secured by bolts or welding to provide reinforcement of the corners of the structure.

The frame is braced transversely by means of brace members 15 which may if desired be constructed from flat strips of metal. These strips may each have upstruck ears 16 therein which serve the purpose of anchoring the lower ends of coil springs 17 which ears serve to prevent the shifting of the springs both longitudinally and laterally.

The brace members 15 may be anchored to the flanges 5 on the marginal frame members and may be secured thereto in overlapping relation. This is considered an extremely important feature of the present invention inasmuch as the double thickness flange provides a structure of great strength which has great resistance to the strains and stresses imposed upon it during use. The fact that the double thickness flange is made of sheet metal folded upon itself insures the fact that access may be conveniently had to both sides thereof in order to perform the welding operation for securing the brace members in place.

Further, and of great importance from a practical standpoint is that in the completed structure the flange is not deformed and lies substantially in the plane of the base frame as a whole. Thus the brace members and the flanged marginal frame members together provide a structure which is extremely strong and rigid in construction, as well as one which is easily and cheaply fabricated.

In case additional bracing is required an X type brace member composed of metallic channel elements 19 and 20 may be secured in position within the frame in the manner shown.

Other modifications falling within the scope of the invention as set forth in the subjoined claims will be apparent to those skilled in the art.

What is claimed is:

1. In a seat construction, a base frame comprising a plurality of sheet metal members secured together to provide a generally rectangular structure defining the marginal edges of said base frame, each of said members comprising a sheet metal strip folded upon itself in its central portion to provide an attaching flange of double thickness, the lateral portions of said strip being bent to provide a tacking strip receiving channel, brace members disposed interiorly of said frame having their ends anchored to said sheet metal members at opposite sides of said frame to strengthen and brace the same, spring supporting members extending across said frame disposed in a plane substantially parallel to, and above the plane in which said brace members lie, the ends of said spring supporting members lying in overlapping relation with respect to said attaching flange and welded thereto.

2. In a seat construction, a base frame comprising a plurality of sheet metal members secured together to provide a generally rectangular structure defining the marginal edges of said base frame, said members each comprising a sheet metal strip folded upon itself to provide a horizontally extending flange of double thickness, the lateral portions of said strip being bent to provide a downwardly presenting tacking strip receiving channel, brace members interconnecting said sheet metal members and secured thereto to strengthen said frame, said brace members being disposed interiorly of said frame, spring supporting members extending transversely across said frame and having their ends lying upon said attaching flanges in overlapping relation therewith, and welded thereto, said spring supporting members being disposed in a plane generally above the plane of said brace members.

ALFRED H. HABERSTUMP.